No. 790,118. PATENTED MAY 16, 1905.
H. J. EVERSON.
FLEXIBLE PIPE JOINT.
APPLICATION FILED JULY 5, 1904.
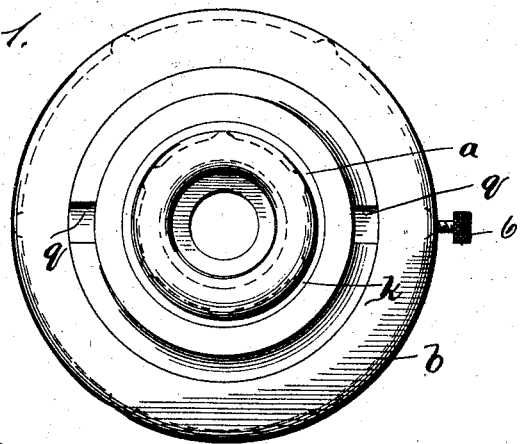
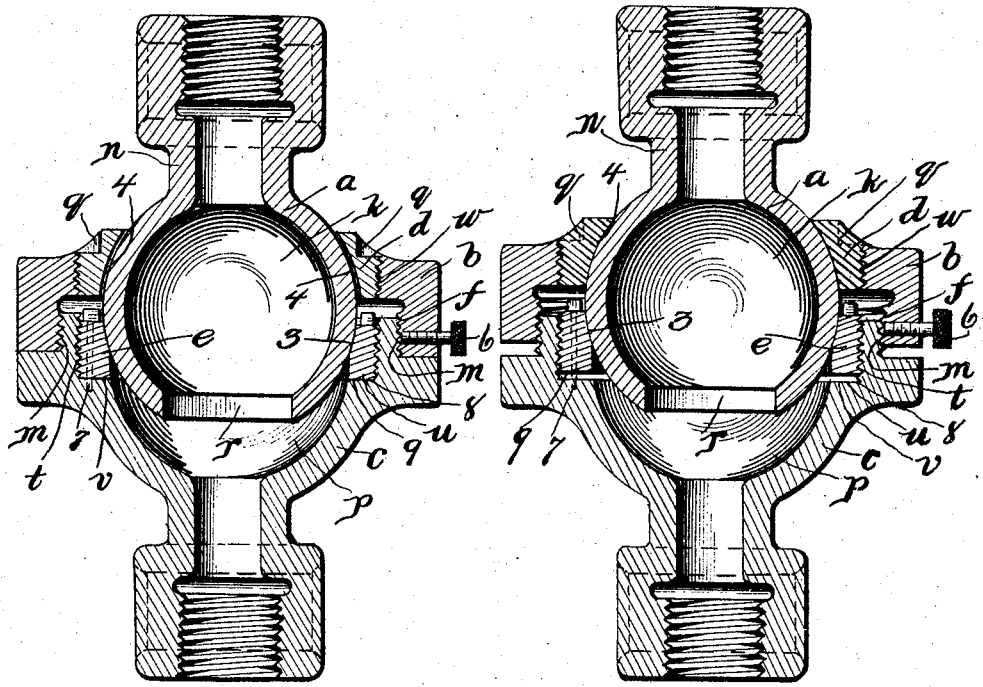
Witnesses
R. A. Boswell
A. G. Gidney
Inventor
H. J. Everson
By E. W. Anderson
his Attorney No. 790,118. Patented May 16, 1905.

UNITED STATES PATENT OFFICE.

HARRY J. EVERSON, OF LOUISVILLE, KENTUCKY.

FLEXIBLE PIPE-JOINT.

SPECIFICATION forming part of Letters Patent No. 790,118, dated May 16, 1905.

Application filed July 5, 1904. Serial No. 215,254.

*To all whom it may concern:*

Be it known that I, HARRY J. EVERSON, a citizen of the United States, and a resident of Louisville, in the county of Jefferson and State of Kentucky, have made a certain new and useful Invention in Flexible Pipe-Joints; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a top plan view of the invention. Fig. 2 is a central sectional view of the same, showing adjustment for steam. Fig. 3 is a central sectional view showing adjustment for liquids.

The invention relates to flexible joints for steam, air, liquids, or gas with or without pressure; and it consists in the novel construction and combinations of parts, as hereinafter set forth.

In the accompanying drawings, illustrating the invention, the letter $a$ designates the inner member of the joint, having the hollow-ball portion $k$, provided with the terminal neck $n$, which is threaded for connection to piping. The ball is designed to be located within the outer member of the joint, which consists, mainly, of the cup or bell portion $c$ and the ring portion $b$, which is provided with a threaded flange $f$, designed to engage the exterior thread $m$ of said bell portion. The chamber $p$ of the bell portion receives the lower end of the ball portion, which is provided with an opening or mouth $r$, communicating with said chamber. The bell portion is also provided with a neck communicating with its chamber and threaded for engagement with piping.

The ball portion when in the bell portion engages annular bearings $d$ and $e$, which are located, respectively, in said ring portion and said bell portion. The annular interior bearing $e$ is exteriorly threaded to engage the interior thread $t$ of the bell, this thread being formed on the inner wall of the seat-recess $u$, which is provided with an annular bottom shoulder $v$. The inner face of this bearing $e$ is provided with an annular concave bearing-face 3, which is ground to fit the surface of the ball below the plane of its center. This bearing is provided with lugs or spanner-holes whereby it can be screwed into position in the bell. The ring portion $b$ is also provided with a threaded seat $w$, into which is screwed the interior ring-bearing $d$, which is provided with an exterior thread for the purpose. A wrench-seat is also provided on this ring-bearing at $q$. The inner surface of this ring-bearing $d$ is ground in annular concave form to provide the bearing-face 4, designed to fit the surface of the ball above the plane of its center. The ring-bearings $d$ and $e$ are removable and adjustable, the depth of the seat-recess $u$ in the bell being made sufficient for a slight eccentric adjustment by depressing the ring-bearing $e$.

A set-screw 6 is provided to keep the ring portion from turning after being screwed home on the bell portion, and a set-screw 7 serves to hold the ring-bearing $e$ in place after adjustment.

By means of the adjustable ring-bearing feature the joint is readily changed from one designed for steam or liquids under constant pressure to a joint for liquids with or without pressure.

In Fig. 2 of the drawings the joint is shown adjusted for steam, the ring-bearing $e$ being depressed in the seat-recess of the bell portion, the joint having in this adjustment a normal loose bearing, which is automatically closed by the steam-pressure. In Fig. 3 the drawing shows the joint adjusted for liquids by moving the ring-bearing to centric position. In this arrangement there is provided a slight interval between the annular shoulder 8 of the bell portion and the bottom 9 of the flange $f$ of the ring portion. The ring portion can then be adapted to prevent clamping the ball; but in the adjustment for steam this interval is designed to be closed by screwing the ring portion $b$ close to said shoulder 8 to provide a steam-tight engagement.

In the construction described it is designed to provide an all-metal joint, which can be used for general purposes, as hereinbefore stated. Steel ring-bearings may be employed with an iron bell and ring portion and a steel ball portion, so that the joint will be very durable, especially as the bearing-rings can be readily removed.

Having described the invention, what I claim, and desire to secure by Letters Patent, is—

1. In a metallic flexible joint, the combination with the hollow-ball portion, the adjustable ring portion and the recessed and shouldered bell portion engaging said ring portion, of the adjustable interior threaded-ring bearing engaging said bell portion, substantially as specified.

2. In a metallic flexible joint, the combination with the hollow-ball portion, the threaded-ring portion and the threaded and recessed bell portion, of the adjustable threaded interior ring-bearings respectively engaging said ring portion and bell portion, substantially as specified.

3. A metallic flexible joint, having a hollow-ball portion, an externally and internally threaded bell portion, a threaded-ring portion adjustably engaging said bell portion, and an interior threaded annular bearing engaging said bell portion and adjustable therein to centric or eccentric position relative to the ball.

In testimony whereof I affix my signature in presence of two witnesses.

HARRY J. EVERSON.

Witnesses:
 E. E. SUTTON,
 MABEL A. WITHERSPOON.